US012594971B2

(12) United States Patent
Chikmangalore Manjunath et al.

(10) Patent No.: US 12,594,971 B2
(45) Date of Patent: Apr. 7, 2026

(54) FLUID CONTROL DEVICE AND METHOD

(71) Applicant: Transportation IP Holdings, LLC, Norwalk, CT (US)

(72) Inventors: Harsha Vardhana Chikmangalore Manjunath, Bangalore (IN); Mahantesh Mallappa Hosur, Bangalore (IN); Jingjun Zhang, Erie, PA (US); Ravikumar Dhulipalla, Bangalore (IN); Anand Gosbal, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 1035 days.

(21) Appl. No.: 17/387,754

(22) Filed: Jul. 28, 2021

(65) Prior Publication Data

US 2023/0035126 A1 Feb. 2, 2023

(51) Int. Cl.
*B61C 15/08* (2006.01)
*B05B 7/04* (2006.01)
(Continued)

(52) U.S. Cl.
CPC .............. *B61C 15/085* (2013.01); *B05B 7/04* (2013.01); *B05B 7/0433* (2013.01);
(Continued)

(58) Field of Classification Search
CPC ..... B61C 15/085; B61C 15/102; B61C 15/08; B61C 15/10; B61C 15/105; B61C 15/107;
(Continued)

(56) References Cited

U.S. PATENT DOCUMENTS

| | | | |
|---|---|---|---|
| 785,284 | A | 3/1905 | Watters |
| 1,164,899 | A | 12/1915 | White |

(Continued)

FOREIGN PATENT DOCUMENTS

| | | | | |
|---|---|---|---|---|
| CH | 550680 A | | 6/1974 | |
| CN | 107207015 A | * | 9/2017 | ............ B60B 19/06 |

(Continued)

OTHER PUBLICATIONS

Office Action for corresponding Eurasian Application No. 202291842 (5 pages).

(Continued)

*Primary Examiner* — S. Joseph Morano
*Assistant Examiner* — James William Jones
(74) *Attorney, Agent, or Firm* — K&L Gates LLP

(57) ABSTRACT

A fluid control device includes a first conduit having a first end and a second end, and a first fluid that moves within the first conduit between the first end and the second end. The first conduit includes an interior surface defining a cavity of the first conduit. The fluid control device includes a second conduit having a third end and a fourth end, and a second fluid that moves within the second conduit between the third and fourth ends. At least a portion of the second conduit extends within the cavity of the first conduit. The first fluid is separate from the second fluid as the first fluid moves within the first conduit and the second fluid moves within the second conduit.

20 Claims, 5 Drawing Sheets

(51) Int. Cl.

| | |
|---|---|
| ***B05B 7/08*** | (2006.01) |
| ***B61C 15/10*** | (2006.01) |
| ***B61C 17/00*** | (2006.01) |

(52) U.S. Cl.

CPC .............. *B05B 7/0441* (2013.01); *B05B 7/08* (2013.01); *B61C 15/08* (2013.01); *B61C 15/10* (2013.01); *B61C 15/102* (2013.01); *B61C 15/105* (2013.01); *B61C 15/107* (2013.01); *B61C 17/00* (2013.01)

(58) Field of Classification Search

CPC .. B61C 17/00; B05B 7/04; B05B 7/08; B05B 7/0433; B05B 7/0441

USPC ............................................................ 105/73

See application file for complete search history.

(56) References Cited

U.S. PATENT DOCUMENTS

| | | | | | |
|---|---|---|---|---|---|
| 2,654,622 | A * | 10/1953 | Foster | B61C 15/102 | 451/75 |
| 3,885,823 | A | 5/1975 | Lee | | |
| 5,100,175 | A | 3/1992 | Swallow et al. | | |
| 2004/0160064 | A1* | 8/2004 | Kish | B61C 15/107 | 291/3 |
| 2012/0061367 | A1* | 3/2012 | Wolff | B61C 15/08 | 219/202 |
| 2013/0206862 | A1 | 8/2013 | Worden et al. | | |
| 2018/0022362 | A1* | 1/2018 | Krismanic | B60B 39/04 | 291/25 |
| 2020/0094855 | A1* | 3/2020 | Worden | B61C 15/107 | |

FOREIGN PATENT DOCUMENTS

| | | | | |
|---|---|---|---|---|
| DE | 2146540 | A1 | 3/1973 | |
| EP | 0217636 | A2 | 4/1987 | |
| EP | 0864848 | B1 | 5/2006 | |
| EP | 3275759 | B1 | 5/2019 | |
| EP | 3590782 | B1 | 9/2021 | |
| GB | 170080 | A | 10/1921 | |
| RU | 2624276 | C2 | 7/2019 | |
| WO | WO-2004080778 | A1 * | 9/2004 | B60B 39/04 |

OTHER PUBLICATIONS

First Examination Report for corresponding AU Application No. 2022204609 dated Aug. 10, 2023 (4 pages).

Extended European Search Report for corresponding EP Application No. 22184300.6-1005 dated Dec. 14, 2022.

* cited by examiner

FLUID CONTROL DEVICE AND METHOD

BACKGROUND

Technical Field

The subject matter described herein relates to fluid control devices and related methods.

Discussion of Art

Fluid devices may be used within systems to control the movement of different fluids in different directions. As one example, a heat exchanger of a mechanical system may include some fluid control device that directs fluids to move in different directions. As another example, a fluid device may be used with a vehicle system, such as a rail vehicle, to direct different fluids in different directions relative to the vehicle and the route along which the vehicle moves. For example, the fluid device may direct a material or substance toward a surface of the route and/or the wheel to change an amount of traction between the surface of the route and the wheel of the vehicle.

Different fluids may be fluidly separate and may be directed within and/or out of the fluid device in the different directions. However, the size and shape of the fluid device, or the system in which the fluid device may be used, may be limited, and therefore the route of one of the fluids may be indirect between an inlet and an outlet. For example, a first fluid may move within a first conduit, with the first conduit extending along a first axis, and a second fluid may move within a second conduit, with the second conduit extending along a second axis. The first axis may intersect with the second axis of the second conduit, and therefore one of the first or second conduits may be positioned to direct the fluid around the other conduit in an indirect direction. Changing the direction of movement of the fluids to bypass other conduits may change flow characteristics of the fluids, such as pressures, velocities, or the like. Therefore, it may be desirable to provide a fluid device that allows fluid streams to pass through and/or around one another without changing characteristics of the fluids moving within the fluid device.

BRIEF DESCRIPTION

In one or more embodiments, a fluid control device includes a first conduit having a first end and a second end, and a first fluid that moves within the first conduit between the first end and the second end. The first conduit includes an interior surface defining a cavity of the first conduit. The fluid control device includes a second conduit having a third end and a fourth end, and a second fluid that moves within the second conduit between the third and fourth ends. At least a portion of the second conduit extends within the cavity of the first conduit. The first fluid is separate from the second fluid as the first fluid moves within the first conduit and the second fluid moves within the second conduit.

In one or more embodiments, a control device includes a first conduit having a first end and a second end, and a first fluid that moves within the first conduit between the first and second ends. The first conduit includes an interior surface defining a cavity of the first conduit. The control device includes a second conduit having a third end and a fourth end, and a second fluid that moves within the second conduit between the third and fourth ends. At least a portion of the second conduit extends within the cavity of the first conduit. The first fluid is separate from the second fluid as the first and second fluids move within the first and second conduits, respectively. The second conduit includes an exterior surface disposed a distance away from the interior surface of the first conduit. The control device includes a structure that is operably coupled with the exterior surface of the second conduit. The first fluid is configured to interfere with the structure as the first fluid moves within the first conduit.

In one or more embodiments, a method includes directing a first fluid to move within a first conduit between a first end and a second end. The first conduit includes an interior surface defining a cavity of the first conduit. A second fluid is directed to move within a second conduit between a third end and a fourth end of the second conduit. At least a portion of the second conduit extends within the cavity of the first conduit. The first fluid is separate from the second fluid as the first and second fluids move within the first and second conduits. The first fluid is separated into a first portion of the first fluid and a second portion of the first fluid. The first portion of the first fluid moves in a first direction around the exterior surface of the second conduit, and the second portion of the first fluid moves in a second directed around the exterior surface of the second conduit.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a fluid control device and method of directing fluids through the fluid control device. The fluid control device may include a first conduit that has a first end and second end, and directs a first fluid to move within the first conduit between the first and second ends. The first conduit may include an interior surface, and a portion of the interior surface may define a cavity of the first conduit. The fluid control device also includes a second conduit that has a third end and a fourth end, and directs a second fluid to move within the second conduit between the third and fourth ends.

At least a portion of the second conduit extends within the cavity of the first conduit. For example, an exterior surface of the second conduit defines part of a flow path of the first fluid to move within the first conduit. The first fluid separates into two or more portions to move in two or more directions around the exterior surface of the second conduit that extends within the cavity of the first conduit. In one or more embodiments, the first and second portions of the first fluid may subsequently combine with each other at a location downstream of the second conduit. For example, the first fluid may separate to move around the second conduit, and may combine again after the first fluid moves around the second conduit. Optionally, the first conduit may include two or more outlets, and the different portions of the first fluid may remain separated and may be directed out of the two or more different outlets of the first conduit.

In one or more embodiment, the fluid control device may include one or more structures that may be positioned to interfere with or change a direction of movement of the first and/or second fluids. For example, a structure may be coupled with and extend a distance away from the exterior surface of the second conduit to interfere with the first fluid at a location upstream of the second conduit. Optionally, a second structure may be coupled with and extend a distance away from the exterior surface of the second conduit to control the movement of the first fluid at a location downstream of the second conduit. Optionally, the fluid control device may include one or more pockets, recesses, or alternative structures that extend into the interior surface of the first conduit, the exterior surface of the second conduit, the interior surface of the second conduit, or the like, to control the movement and/or characteristics of the first and/or second fluids.

Figure 1:
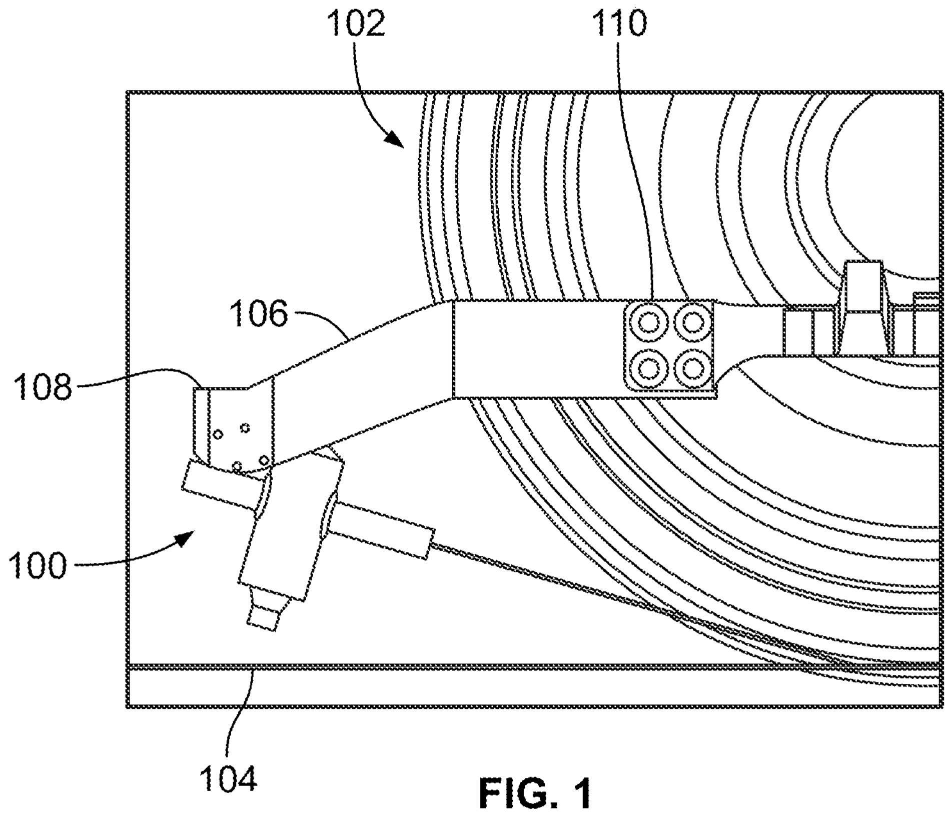
FIG. 1 illustrates a side view of a fluid control device coupled with a vehicle in accordance with one embodiment.

FIG. 1 illustrates a side view of a fluid control device 100 operably coupled with a vehicle in accordance with one embodiment. The fluid control device may be coupled with a vehicle system such as a rail vehicle, a car, or other passenger vehicle, a mining vehicle, a bus, an aircraft, agricultural equipment, or another off-highway vehicle. In particular, the fluid control device is coupled with a wheel 102 of the vehicle (not shown) via a coupling device 106. In the illustrated embodiment, the coupling device is a bracket that extends between a first end 108 and a second end 110. The fluid control device is coupled with the first end via one or more fasteners (e.g., screws, bolts, male and corresponding female mating features, or the like), may be welded to the first end, or any alternative method. The second end of the coupling device is operably coupled with a portion of the vehicle by one or more fasteners, welding, or the like. The coupling device maintains a position of the fluid control device such that the fluid control device can direct different fluids in different directions to change characteristics of the surface of the wheel, the surface of the route, or the like. For example, a first fluid may be directed through the fluid control device toward a surface of the wheel of the vehicle. Additionally, a second fluid may be directed through the fluid control device toward a surface of a route 104 along which the vehicle moves. The route may be a road or pathway, a track, or the like.

Figure 2:
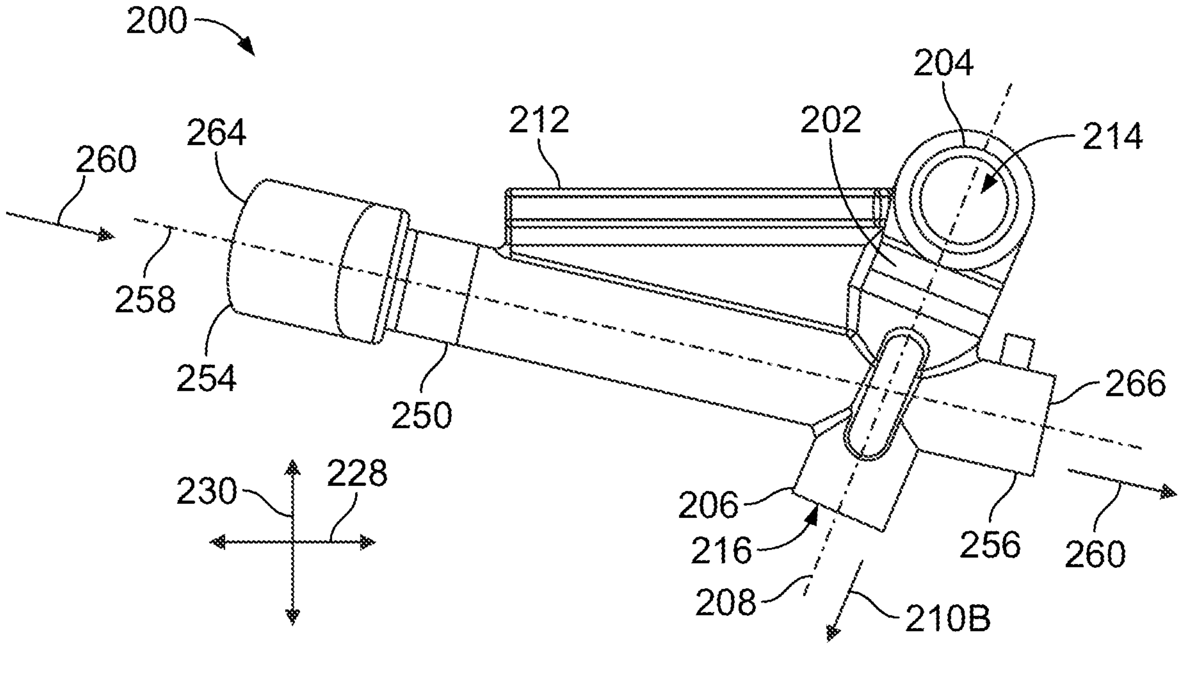
FIG. 2 illustrates a side view of a fluid control device in accordance with one embodiment.
Figure 3:
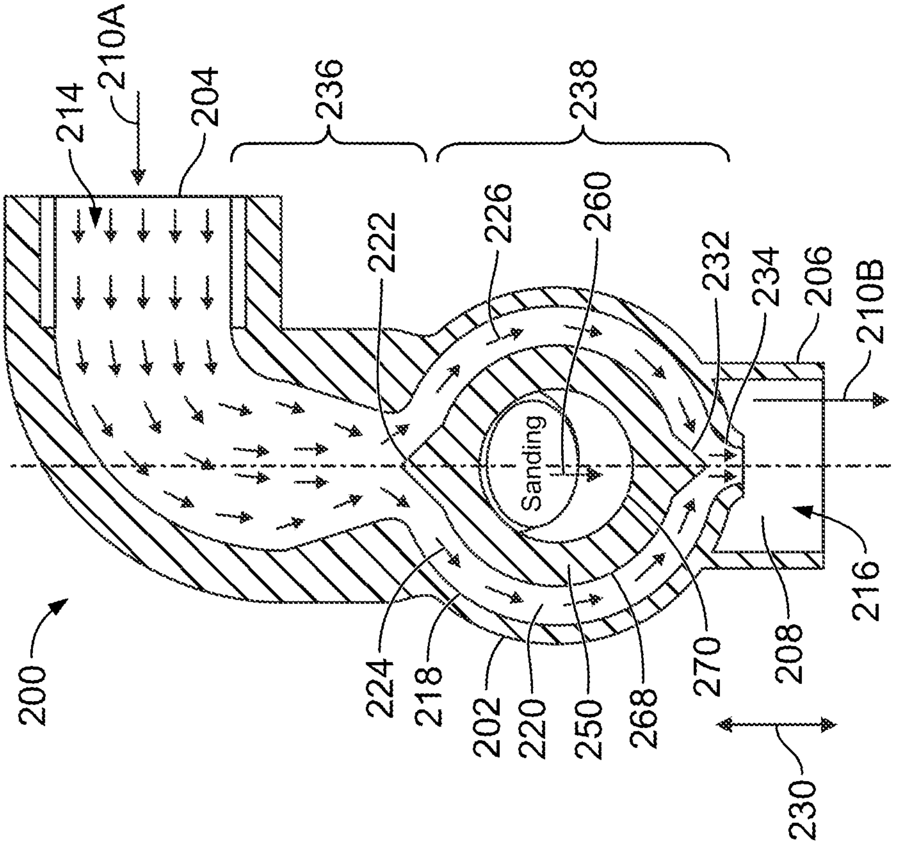
FIG. 3 illustrates a partial cross-sectional view of the fluid control device shown in FIG. 2.

FIG. 2 illustrates a side view of a fluid control device 200 in accordance with one embodiment. FIG. 3 illustrates a partial cross-sectional view of the fluid control device shown in FIG. 2. The fluid control device has a body 212 that is defined by plural surfaces. The body is shaped and sized to direct plural different fluids in one or more directions within the body of the fluid control device, and one or more directions outside or the body. The body is formed as a unitary structure. For example, the body may be cast, molded, extruded, 3D printed, or the like, as a single entity or structure. Optionally, one or more features of the fluid control device may be formed as a separate entity and may be operably coupled with other features of the fluid control device via one or more known coupling methods, such as, but not limited to, adhesion, welding, fastening, or the like.

The fluid control device includes a first conduit 202 having a first end 204 and a second end 206. A portion of the first conduit extends along an axis 208 of the first conduit. The first conduit includes an opening or passage at an inlet 214 of the first end, and an opening or passage at an outlet 216 of the second end. A first fluid is configured to be directed into the first conduit via the inlet, and directed out of the first conduit via the outlet in a direction of movement of the first fluid 210A. In the illustrated embodiment, the inlet is positioned such that the first fluid is directed into the inlet in a first direction, and the outlet is positioned such that the first fluid is directed out of the outlet in a second direction 210B that is substantially perpendicular to the first direction. Optionally, the first conduit may have any alternative orientation and/or configuration. Optionally, the first conduit may have an alternative shape, size, orientation, and/or configuration, that directs the first fluid in one or more different or common directions within the first conduit.

The fluid control device includes a second conduit 250 that includes a third end 254 and a fourth end 256. The second conduit extends along an axis 258. The second conduit includes an inlet 264 disposed at the third end of the second conduit, and an outlet 266 disposed at the fourth end of the second conduit. A second fluid is configured to be directed into the second conduit via the inlet, and directed out of the second conduit via the outlet in a direction of movement 260 of the second fluid. Additionally, the first fluid moves within the first conduit in the first direction 210B, and the second fluid moves within the second conduit in the different, second direction 260. In the illustrated embodiment of FIG. 2, the second fluid moves in a direction into the inlet of the second conduit, and moves in substantially the same direction out of the outlet of the second conduit. For example, the inlet and the outlet are planar and have a common orientation with each other. Optionally, the second conduit may have an alternative shape, size, orientation, and/or configuration, that directs the second fluid in one or more different or common directions within the second conduit.

The first and second conduits may be formed as a unitary embodiment or structure. For example, the first and second conduits may be molded, extruded, 3D printed, or the like, as a single entity or structure. Optionally, a portion of one of the first or second conduits may be formed as a separate entity or structure, and may be coupled with (e.g., via known coupling methods) another structure to form the fluid control device. The fluid control device may be manufactured of a metal or metallic alloy, a non-metallic material such as a plastic material, an elastomeric material, an engineered material, or the like. Optionally, the first and second conduits may be molded, formed, 3D printed, or the like, of the same material compound, or alternatively a portion of one of the first or second conduits may be manufactured of an alternative material.

The first and second conduits of the fluid control device are oriented to direct the first and second fluids in different directions. For example, the first conduit includes the outlet (e.g., a first outlet) disposed at the second end of the first conduit, and the second conduit includes an outlet (e.g., a second outlet) disposed at the fourth end of the second conduit. The first fluid is directed out of the first outlet in a first radial direction (e.g., the direction 210B) and the second fluid is directed out of the second outlet in a different, second radial direction (e.g., the direction 260). The first radial direction is radially offset from the first radial direction, for example, relative to an X-axis 228 and a Y-axis 230. Additionally, the first radial direction is coplanar with the second radial direction. For example, the first fluid and the second fluid are directed out of the first and second conduits, respectively, in a common or same plane relative to the vertical axis.

The first conduit has an interior surface 218 that defines a cavity 220 of the first conduit. The second conduit has an exterior surface 268 that is a shared or common surface as an interior surface of the first conduit. For example, a portion of the second conduit extends within the cavity of the first conduit. The first fluid is separate from the second fluid as the first and second fluids move within the first and second conduits, respectively. The exterior surface of the second conduit is disposed or positioned a distance away from the interior surface of the first conduit. For example, a space or gap between the exterior surface of the second conduit and the interior surface of the first conduit forms passages within the cavity through which the first fluid is directed as the first fluid moves from the inlet toward the outlet of the first conduit. For example, the space or gaps between the exterior surface of the second conduit and the interior surface of the first conduit form passages, plenums, or the like, through which the first fluid moves between the inlet and the outlet of the first conduit.

The second conduit includes an interior surface 270 that defines a passage through which the second fluid is directed through between the inlet and outlet of the second conduit. In the illustrated embodiment, the second conduit has a substantially uniform shape and size between the inlet and the outlet of the second conduit. Optionally, the size and/or shape of the second conduit may vary at one or more locations between the inlet and the outlet to control flow characteristics (e.g., pressure, velocity, turbulence, rotational forces, or the like) of the second fluid as the second fluid moves between the inlet and the outlet.

The first conduit includes a first region 236 that is fluidly coupled with the inlet of the first conduit, and a second region 238 that is downstream of the first region in the direction of movement of the first fluid. The first region may be shaped and sized to control one or more flow characteristics of the first fluid within the first region. For example, the first region may be funnel-shaped to control a pressure, a flow rate, a direction of movement, a volumetric flow rate, velocity, turbulence, rotational forces, or the like, of the first fluid within the first region.

The first region is fluidly coupled with the second region of the first conduit. The first is separated into a first portion 224 of the first fluid and a second portion 226 of the first fluid. For example, the portion of the second conduit that extends within the first conduit causes the first fluid to separate into the first and second portions. The first portion of the first fluid moves in a first direction around the exterior surface of the second conduit and between the exterior surface of the second conduit and the interior surface of the first conduit. Additionally, the second portion of the first fluid moves in a different, second direction around the exterior surface of the second conduit and between the exterior surface of the second conduit and the interior surface of the first conduit.

In the illustrated embodiment, the second conduit is positioned within a substantial center of the cavity of the first conduit such that an amount of the first portion of the first fluid is substantially the same as an amount of the second portion of the first fluid. For example, the first and second portions have substantially the same or a similar amount of fluid within each portion. Alternatively, the second conduit may be in an alternative position such that the first portion of the first fluid is a greater amount of the first fluid than the second portion of the first fluid. For example, an amount of the first fluid may move in a first direction around the exterior surface of the second conduit, and a different amount of the first fluid may move in a second direction around the exterior surface of the second conduit.

The first portion of the fluid combines with the second portion of the fluid subsequent to the first portion of the first fluid moving in the first direction around the exterior surface of the second conduit, and the second portion of the first fluid moving in the second direction around the exterior surface of the second conduit. For example, the first fluid separates into the first and second portions to move around the second conduit, and the first and second portions subsequently combine with each other at a location downstream of the second conduit.

The fluid control device includes a structure 222 operably coupled with and extending a distance away from the exterior surface of the second conduit. The structure may be formed as a unitary body with the fluid control device, or may be formed as a separate entity and may be coupled with the fluid control device. In one or more embodiments, the structure may be referred to as an inlet structure, an interference structure, or the like. The structure is disposed at the intersection of the first region and the second region of the first conduit. In the illustrated embodiment, the structure has a wedge, a tear-drop, or triangular cross-sectional shape with an apex of the triangular shape extending from the second region toward the first region of the first conduit. Optionally, the structure may have any alternative shape, size, and/or orientation. The structure is positioned in order for the structure to interfere with the first fluid as the first fluid moves from the first region toward the second region. For example, the structure interferes with the first fluid to promote the separation of the first portion of the first fluid from the second portion of the first fluid and to split or separate the first portion of the first fluid from the second portion of the first fluid.

The first and second portions of the first fluid combine prior to the first fluid being directed out of the outlet of the first conduit. In one or more embodiments, the fluid control device includes an outlet structure 232 operably coupled with and extending a distance away from the exterior surface of the second conduit. The outlet structure may be formed as a unitary embodiment with the fluid control device, or alternatively may be formed as a separate entity that may be operably coupled with the fluid control device via one or more coupling methods. The outlet structure may control flow characteristics of the first fluid as the first fluid moves away from the second region and toward the outlet of the first conduit. In the illustrated embodiment, the outlet structure has a wedge, a tear-drop, or triangular cross-sectional shape with an apex extending toward the outlet of the first conduit. Optionally, the outlet structure may have any alternative shape, size, and/or orientation. In one or more embodiments, the outlet structure may have a common or similar shape and/or size as the structure disposed between the first and second regions of the first conduit.

The first conduit is shaped and sized to control one or more flow characteristics of the first fluid as the first fluid moves between the inlet and the outlet of the first conduit. For example, the first conduit includes one or more features or structures that control the flow characteristics of the first fluid as the first fluid moves around the second conduit that extends within the cavity of the first conduit. For example, movement of the first fluid around the second conduit may cause one or more characteristics to change from a location upstream of the second conduit to a location downstream of the second conduit. The features and/or structures, and the shape and size of the first conduit control the amount of change of the characteristics of the first fluid. For example, the first conduit is shaped to have flow characteristics at a location upstream of the second conduit (e.g., in the first region of the first conduit) and to have the same flow characteristics at a location downstream of the second conduit (e.g., proximate the outlet of the first conduit). For example, the first conduit of the fluid control device is shaped to allow the second fluid to move within the portion of the second conduit that extends within the cavity of the first conduit without compromising one or more flow characteristics (e.g., pressure drop, velocity, or the like) of the first fluid as the first fluid moves within the first conduit. For example, the velocity of the first fluid at the inlet may be substantially the same. In another embodiment, the velocity may differ by a determined percentage (e.g., about 2%, 5%, 10%) of the velocity of the first fluid at the outlet of the first conduit.

The structure disposed between the first and second regions may promote the separation of the first fluid in to the first and second portions of the first fluid to move around the second conduit. The passages or plenums through which the first and second portions of the first fluid move are shaped and sized to control the flow characteristics (e.g., velocity, pressure, or the like) of the first and second portions within the second region. For example, a velocity of the first fluid may increase as the first and second portions of the fluid move through the plenums or passages of the second region toward the outlet. Additionally, the outlet structure is shaped to reduce a volume or amount of the first portion of the first fluid that may collide with the second portion of the first fluid. For example, the outlet structure may be shaped and sized to control the velocity of the first and second portions of the first fluid such that a velocity of the first fluid within the second region of the first conduit is substantially the same. In one embodiment, the ratio of velocity is a non-zero different ratio. Suitable ratio ranges may be within a range of from about 2% to about 5% relative to each other. In another embodiment, the velocity ratio is in a range of from about 6% to about 10% of a velocity of the first fluid directed toward the outlet. In one embodiment, the velocity ratio between the two flow paths is greater than 11% different from each other. As above, the velocity ratio may be selected based on application specific parameters. Such parameters may include factoring in the orientation of the split with regard to gravity. For example, particulate in a stream bifurcated into an over and under flow path may gravitate to the under or lower flow path. Thus, is may be useful in such an application to have the lower or under flow path be wider (and with an accordingly different velocity) to accommodate the particulate.

In the illustrated embodiment of FIG. 3, the first conduit includes a single outlet that directs the combined portions of the first fluid out of the first conduit. Optionally, the first and second portions may remain separated and may be directed out of the first conduit via two or more outlets (not shown). The outlet of the first conduit includes an outlet nozzle 234 that has a cross-sectional size that is substantially the same as a cross-sectional size of the gap or space between the interior surface of the first conduit and the exterior surface of the second conduit. Additionally, the outlet nozzle has a cross-sectional size that is smaller or less than a cross-sectional size of the outlet. For example, the first fluid may be directed through the smaller outlet nozzle toward the larger outlet of the first conduit. The shape and/or size of the outlet nozzle and/or the outlet may be controlled to control one or more flow characteristics of the first fluid. For example, the outlet, outlet nozzle, and the cavity of the first conduit may be shaped and sized to control a pressure, a flow rate, a direction of movement, a volumetric flow rate, velocity, turbulence, rotational forces, or the like, of the first fluid as the first fluid moves within the first conduit.

Figure 4:
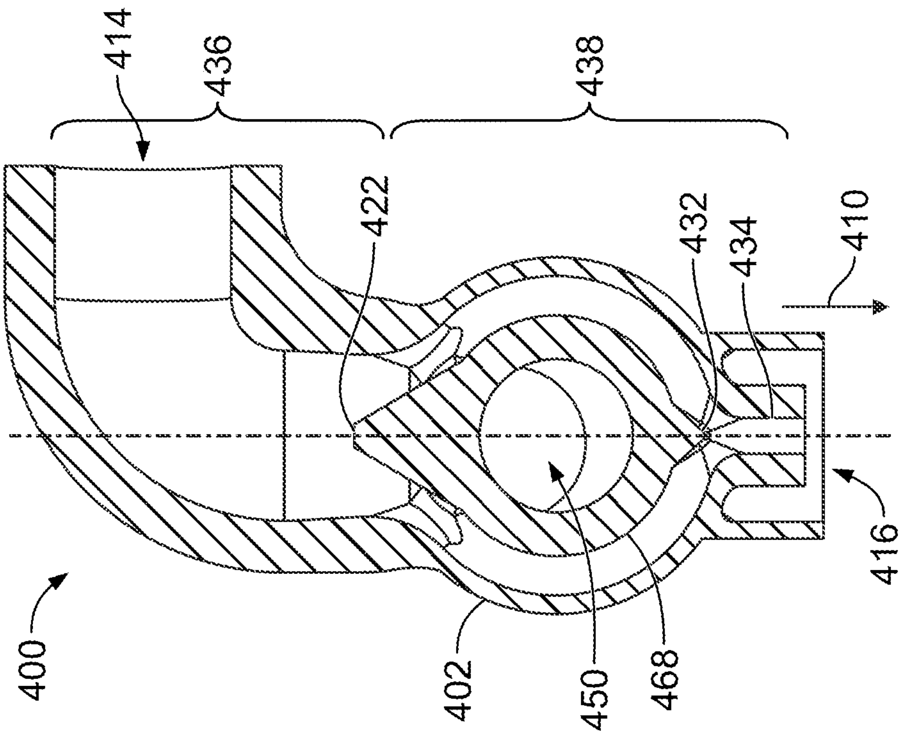
FIG. 4 illustrates a partial cross-sectional view of a fluid control device in accordance with one embodiment.

Optionally, the outlet of the first conduit may have an alternative shape and/or size. For example, FIG. 4 illustrates a cross-sectional view of a fluid control device 400 in accordance with one embodiment. Like the fluid control device shown in FIG. 3, the fluid control device includes a first conduit 402 and a second conduit 450, and a portion of the second conduit extends within a cavity of the first conduit. The first conduit is separated into a first region 436 that includes an inlet 414 of the first conduit, and a second region 438 that includes an outlet of the first conduit. The first fluid is directed into the first conduit via the inlet, and is directed toward the second region. The first fluid separates into different portions of the fluid within the second region to move in different directions around an exterior surface 468 of the second conduit 450.

In the illustrated embodiment of FIG. 4, the fluid control device includes an inlet structure 422 disposed at the intersection of the first region and the second region. The inlet structure is positioned to control flow characteristics of the first fluid as the first fluid moves from the first region toward the second region. Like the structure shown in FIG. 3, the inlet structure is shaped and positioned to interfere with the first fluid and to promote the separation of the first fluid into the different portions of the first fluid to move in different directions around the second conduit. The inlet structure shown in FIG. 4, however, has a size that is different than the size of the inlet structure illustrated in FIG. 2. Optionally, the inlet structure may have any alternative shape and/or size, and may be positioned in an alternative location within the first conduit to control the one or more flow characteristics of the first fluid.

In one or more embodiments, the fluid control device may include an outlet structure 432 disposed at a position between the second conduit and the outlet of the first conduit. For example, the outlet structure is positioned to control one or more flow characteristics of the different portions of the first fluid after the different portions of the first fluid move around the second conduit in different directions. In the illustrated embodiment of FIG. 4, the outlet structure has a shape that is similar to the shape of the inlet structure, but a size of the outlet structure differs from a size of the inlet structure. Optionally, the inlet and outlet structures may have common or different shapes and/or sizes.

The different portions of the first fluid combine together at a location downstream of the second conduit, subsequent to the different portions moving in different directions around the second conduit that extends within the cavity of the first conduit. In the illustrated embodiment of FIG. 4, the outlet of the first conduit includes an outlet nozzle 434 that directs the first fluid out of the first conduit toward the outlet in the direction 410. The outlet nozzle is shaped to control characteristics of the first fluid. For example, the outlet nozzle extends a distance between the outlet structure and the outlet of the first conduit that is greater than a distance the outlet nozzle shown in FIG. 3 extends between the outlet structure and the outlet. Optionally, the outlet of the first conduit may have any alternative configuration to control characteristics of the first fluid within the first conduit.

In one or more embodiments, the first conduit may include an outlet control structure that may be disposed proximate the outlet of the first conduit. For example, FIG.

5 illustrates a cross-sectional view of a fluid control device 500 in accordance with one embodiment. Like the fluid control device illustrated in FIGS. 3 and 4, the fluid control device includes a first conduit 502 and a second conduit 550, and a portion of the second conduit extends within a cavity of the first conduit. The fluid control device includes an inlet structure 522 operably coupled with an exterior surface 568 of the second conduit that extends a distance away from the exterior surface toward the inlet of the first conduit. Additionally, the fluid control device includes an outlet structure 532 operably coupled with the exterior surface of the second conduit that extends a distance away from the exterior surface toward an outlet 516 of the first conduit. The inlet and outlet structures are shaped, sized, and positioned to control one or more characteristics of the first fluid that moves within the first conduit in a direction 510. The first conduit is separated into a first region 537 that includes an inlet 514 of the first conduit, and a second region 538 that includes the outlet of the first conduit.

The outlet of the first conduit is operably and fluidly coupled with an outlet control structure 534. In one or more embodiments, the outlet control structure may be a separate entity or structure, and may be coupled with the outlet of the first conduit by known coupling methods (e.g., mating threads, alternative retainment features such as snaps, interference fit, welding, adhering, or the like). The outlet control device includes an outlet nozzle 536 that is fluidly coupled with the outlet of the first conduit and directs the first fluid out of the first conduit and out of the fluid control device. For example, the outlet control structure may be positioned to control one or more characteristics of the first fluid as the first fluid moves out of the first conduit (e.g., a direction of movement, pressure, velocity, rotational forces, turbulence, or the like). In one or more embodiments, the outlet control structure may be a nozzle, a funnel device, or the like.

Figure 6:
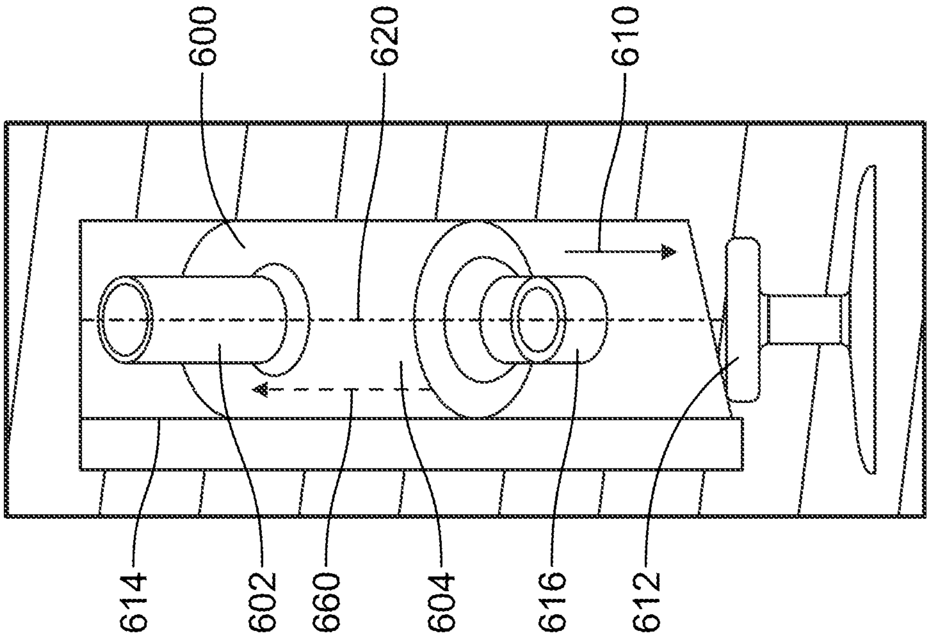
FIG. 6 illustrates a front view of a fluid control device in accordance with one embodiment
Figure 5:
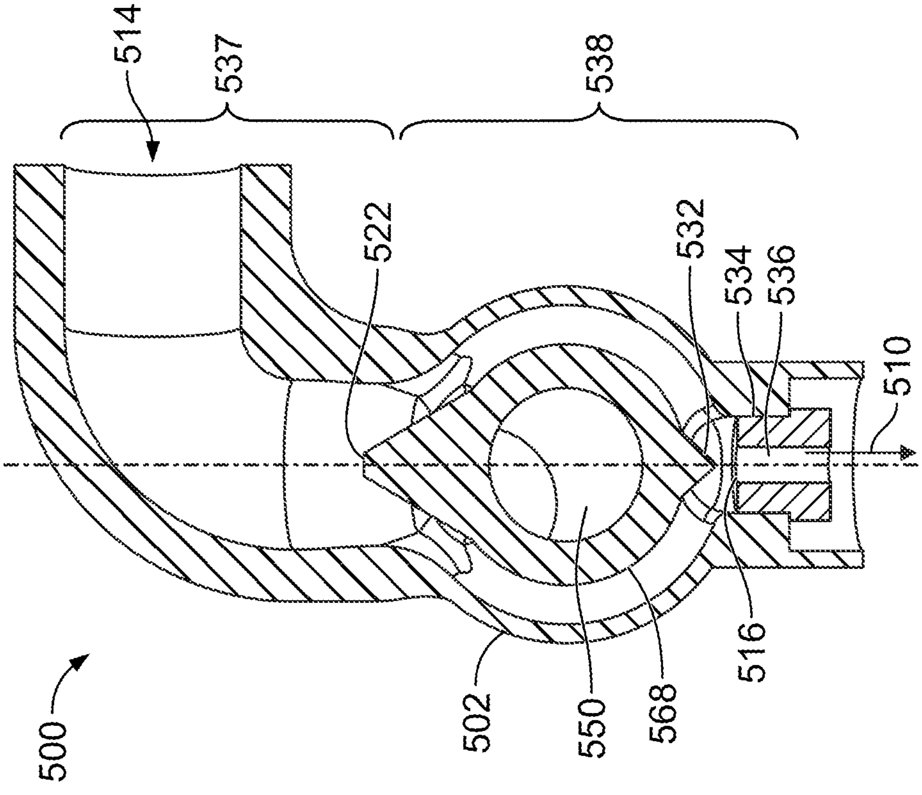
FIG. 5 illustrates a partial cross-sectional view of a fluid control device in accordance with another embodiment.

In one or more embodiments, the fluid control device may be operably coupled with a vehicle (not shown), and may direct the different first and second fluids in different directions relative to the vehicle and a route long which the vehicle moves. For example, the fluid control device may be used as a traction control system to control an amount of traction between wheels of the vehicle and a surface of the route. For example, FIG. 6 illustrates a front view of a fluid control device 600 in accordance with one embodiment. The fluid control device may be operably coupled with a vehicle (not shown) such as a rail vehicle or locomotive that may move along a railway track. Optionally, the vehicle may be a non-rail vehicle such as, but not limited to, a car or other passenger vehicle, a mining vehicle, a bus, an aircraft, agricultural equipment, or another off-highway vehicle, or the like, that may move along a non-rail route.

The fluid control device includes a first conduit 602 and a second conduit 604, with a portion of the second conduit extending within a cavity of the first conduit. A first fluid may be directed out of an outlet 616 of the first conduit in a direction 610 toward a surface of a route 612. In one or more embodiments, the first conduit may be coupled with a compressed air system (not shown) of the vehicle and may receive the first fluid from the compressed air system. For example, the first fluid may be and/or include compressed air. A second fluid may be directed out of an outlet of the second conduit (not shown) in a second direction 660 toward a surface a wheel 614 of the vehicle. In one or more embodiments, the second conduit may be coupled with a sanding system of the vehicle for receiving the second fluid from the sanding system. The second fluid may be and/or include sand mixed with air. The first conduit directs the compressed air toward the surface of the route along which the vehicle moves to clean the surface of debris. For example, the compressed air moves at least some debris away from the surface of the route. The second conduit directs the sand mixed with air toward an interface surface between the route and a wheel of the vehicle. For example, the sand mixed with air directed toward the surface of the route improves traction of the wheel against the surface of the route.

The first direction of the first fluid toward the surface of the route may be radially offset from the second direction of the second fluid that is directed toward the surface of the wheel. Additionally, the first and second directions may be coplanar, such that the first and second fluids are directed along a common plane 620. In one or more embodiments, the first fluid may be directed toward a centerline of a width of the surface of the route, or toward a center region of the width of the route. Additionally, the second fluid may be directed toward a centerline of a width of the surface of the wheel, or toward a center region of the width of the wheel. Optionally, the first and second fluids may be directed toward alternative locations of the surface of the route and the wheel, respectively.

The first and second fluids may control one or more characteristics of the surface of the route and the surface of the wheel, respectively. As an example, the first fluid may be compressed air that is directed toward a surface of the route in a direction away from the wheel. The compressed air may be used to control an amount of debris or foreign matter than may be disposed on the route. For example, the first fluid may be directed toward the surface of the route in a first direction relative to the wheel. In this embodiment, the first fluid may remove a portion of the debris or foreign matter from the surface of the route. Removing material (e.g., debris) from the route may control a cleanliness of the surface of the route prior to the wheel of the vehicle contacting the surface of the route (e.g., in the direction of movement of the vehicle). The second fluid also may be directed toward the surface of the route. The second fluid may be directed at the surface in a different direction than the direction of the first fluid. In either case, the surface may be a portion of a route, a portion of a track, or the wheel of the vehicle itself. Either or both of the first and second fluids may be fluid only or may be a fluid-solid mixture. Suitable mixtures may include particulate matter combined with a fluid. Suitable fluids may include air, water, or the like. Suitable particulate may include abrasives. Suitable abrasives may include sand, nut shell fragments, or the like. In this example, the second fluid may control an amount of traction, adhesion, abrasion, friction, lubricity, or the like, between the surface of the wheel and the surface of the route. In another example, rather than debris the route surface may just be wet and the compressed air may dry the route surface.

As another example, the fluid control device may be used within a heat exchanger system, within a wall or surface of a housing, or the like. For example, the fluid control device may be used within any system that directs different fluids in different directions. In the illustrated embodiment of FIGS. 1 and 6, the fluid control device is operably coupled with a vehicle, but alternatively may be used within an alternative mobile and/or stationary system. For example, the fluid control device may be disposed within a facility such as a laboratory, a storage facility, a school, an office building, a gymnasium, an arena, or any alternative building or facility that may require filtration.

Figure 7:
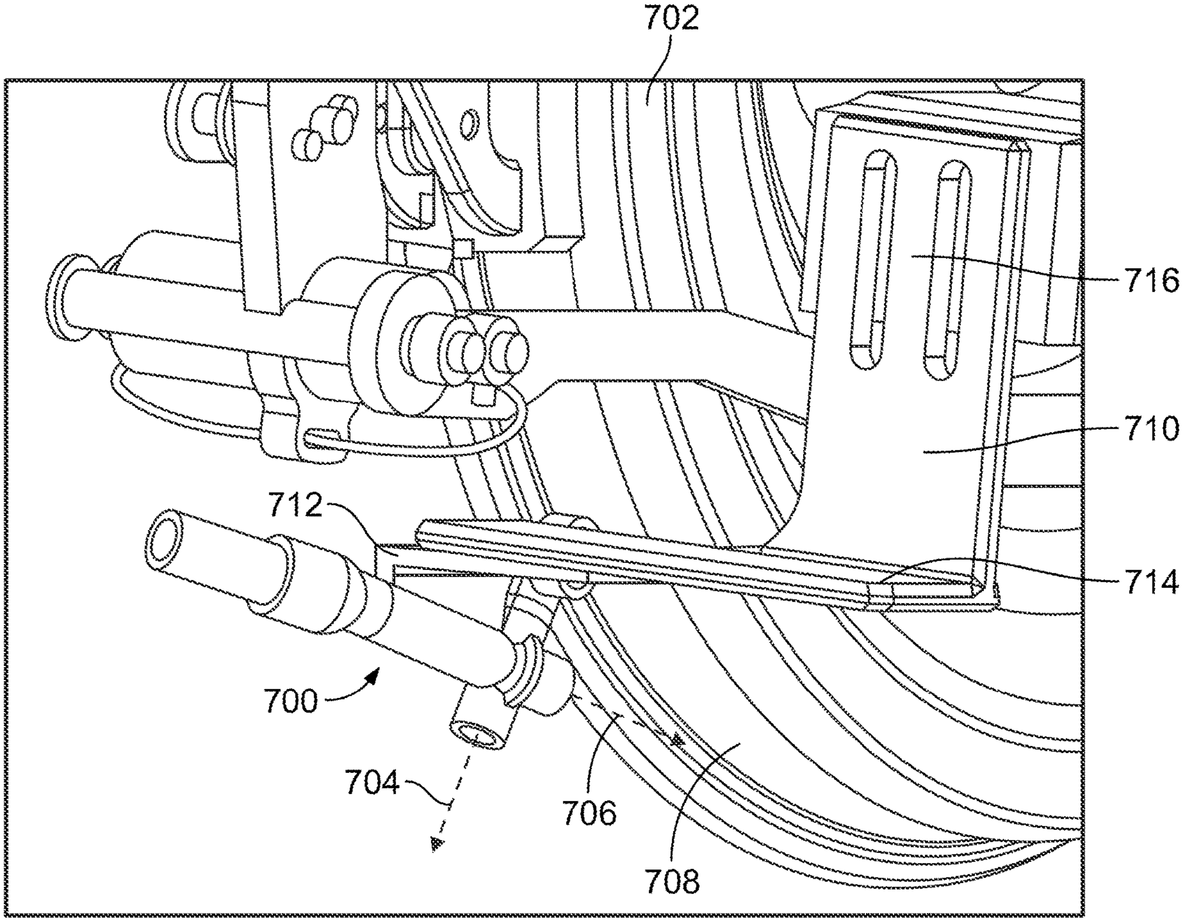
FIG. 7 illustrates a perspective view of a fluid control device coupled with a vehicle in accordance with one embodiment.

FIG. 7 illustrates a perspective view of a fluid control device 700 coupled with a vehicle 702 in accordance with one embodiment. In particular, the fluid control device may be coupled with the vehicle such that the fluid control device is positioned to direct a first fluid 704 toward a surface of a route along which the vehicle moves and a second fluid 706 toward surface of a wheel 708 of the vehicle.

The fluid control device may include a device bracket 712 that is coupled with a mounting bracket 710. The mounting bracket is a substantially L-shaped bracket that includes a first portion 714 that extends in a substantially horizontal direction, and a second portion 716 that extends in a substantially vertical direction. Optionally, the mounting bracket may have any alternative shape, size, orientation, and/or configuration. The device bracket is coupled with the first portion of the mounting bracket. For example, the device bracket and the mounting bracket may include mating components or features (e.g., alignment pins and pockets, male/female structures, or the like) that couples the fluid control device to the mounting bracket. Optionally, the device bracket may be coupled with the mounting bracket via alternative coupling methods such as, but not limited to, welding, adhering, fastening, or the like. Additionally, the second portion of the mounting bracket may be coupled with the vehicle via a known coupling methods such as, but not limited to, welding, adhering, fastening, or the like. Optionally, the fluid control device and the mounting bracket may be formed together as a unitary structure or unitary embodiment. Optionally, the fluid control device may be coupled with the vehicle via an alternative coupling method.

Figure 8:
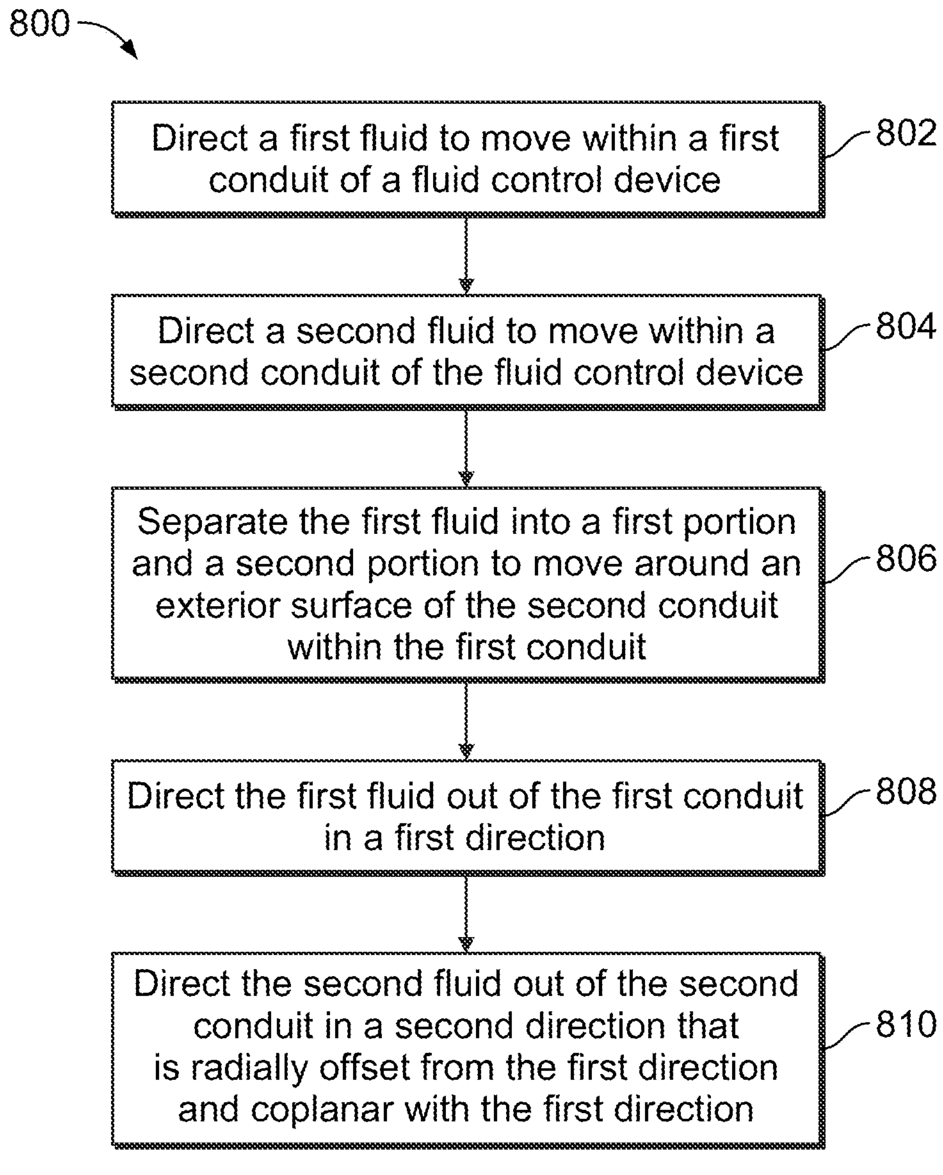
FIG. 8 illustrates a flowchart of one example of a method for directing fluid through a fluid control device.

FIG. 8 illustrates a flowchart 800 of one example of a method for directing fluid through a fluid control device. At 802, a first fluid is directed to move within a first conduit of a fluid control device, and at 804, a second fluid is directed to move within a second conduit of the fluid control device. The first and second conduits extend along different axes, respectively, that may intersect with each other. For example, a portion of the second conduit may extend within a cavity of the first conduit. At 806, the first fluid is separated into a first portion that is directed to move in a first direction around an exterior surface of the second conduit, and a second portion that is directed to move in a second direction around the exterior surface of the second conduit. For example, the first fluid is directed in one or more directions around the portion of the second conduit that extends within the cavity of the first conduit.

At 808, the first fluid is directed out of the first conduit in a first direction, and at 810, the second fluid is directed out of the second conduit in a different second direction. The first direction is radially offset from the second direction, and the first and second directions of the first and second fluids are coplanar.

In one or more embodiments of the subject matter described herein, a fluid control device includes a first conduit having a first end and a second end, and a first fluid that moves within the first conduit between the first end and the second end. The first conduit includes an interior surface defining a cavity of the first conduit. The fluid control device includes a second conduit having a third end and a fourth end, and a second fluid that moves within the second conduit between the third and fourth ends. At least a portion of the second conduit extends within the cavity of the first conduit. The first fluid is separate from the second fluid as the first fluid moves within the first conduit and the second fluid moves within the second conduit.

Optionally, the second conduit includes an exterior surface configured to be disposed a distance away from the interior surface of the first conduit.

Optionally, the fluid control device may include a structure operably coupled with and extending a distance away from the exterior surface of the second conduit. Optionally, the first fluid may interfere with the structure as the first fluid moves within the first conduit. Optionally, the first fluid may separate into a first portion of the first fluid and a second portion of the first fluid. The first portion of the first fluid may move in a first direction around the exterior surface of the second conduit, and the second portion of the first fluid may moves in a second direction around the exterior surface of the second conduit. Optionally, the first portion of the first fluid may combine with the second portion of the first fluid subsequent to the first portion of the first fluid moving in the first direction around the exterior surface of the second conduit and the second portion of the first fluid moving in the second direction around the exterior surface of the second conduit. Optionally, the first fluid may have flow characteristics at a location upstream of the second conduit, and the first fluid may have the same flow characteristics at a location downstream of the second conduit. Optionally, the first fluid may move within the first conduit in a first direction, and the second fluid may move within the second conduit in a different, second direction. Optionally, the first conduit may include a first outlet disposed at the second end of the first conduit, and the second conduit may include a second outlet disposed at the fourth end of the second conduit. The first fluid may be directed out of the first outlet of the first conduit in a first radial direction, and the second fluid may be directed out of the second outlet of the second conduit in a second radial direction that is radially offset from the first radial direction. Optionally, the first radial direction may be coplanar with the second radial direction. Optionally, the first conduit and the second conduit may be formed as a unitary structure. Optionally, the first fluid may be directed out of the first conduit toward a surface of a route along which a vehicle moves, and the second fluid may be directed out of the second conduit and toward a surface of a wheel of the vehicle. Optionally, the first fluid may change a characteristic of the surface of the route, and the second fluid may change a characteristic of the surface of the wheel.

In one or more embodiments of the subject matter described herein, a control device includes a first conduit having a first end and a second end, and a first fluid that moves within the first conduit between the first and second ends. The first conduit includes an interior surface defining a cavity of the first conduit. The control device includes a second conduit having a third end and a fourth end, and a second fluid that moves within the second conduit between the third and fourth ends. At least a portion of the second conduit extends within the cavity of the first conduit. The first fluid is separate from the second fluid as the first and second fluids move within the first and second conduits, respectively. The second conduit includes an exterior surface disposed a distance away from the interior surface of the first conduit. The control device includes a structure that is operably coupled with the exterior surface of the second conduit. The first fluid is configured to interfere with the structure as the first fluid moves within the first conduit.

Optionally, the first fluid may separate into a first portion of the first fluid and a second portion of the first fluid. The first portion of the first fluid may move in a first direction around the exterior surface of the second conduit, and the second portion of the first fluid may move in a second direction around the exterior surface of the second conduit. Optionally, the first fluid may move within the first conduit in a first radial direction, and the second fluid may move within the second conduit in a different, second radial direction. The first radial direction may be coplanar with the second radial direction. Optionally, the first fluid may be directed out of the first conduit and toward a surface of a route along which a vehicle moves, and the second fluid may be directed out of the second conduit and toward a surface of a wheel of the vehicle. Optionally, the first fluid may change a characteristic of the surface of the route, and the second fluid may change a characteristic of the surface of the wheel.

In one or more embodiments of the subject matter described herein, a method includes directing a first fluid to move within a first conduit between a first end and a second end. The first conduit includes an interior surface defining a cavity of the first conduit. A second fluid is directed to move within a second conduit between a third end and a fourth end of the second conduit. At least a portion of the second conduit extends within the cavity of the first conduit. The first fluid is separate from the second fluid as the first and second fluids move within the first and second conduits. The first fluid is separated into a first portion of the first fluid and a second portion of the first fluid. The first portion of the first fluid moves in a first direction around the exterior surface of the second conduit, and the second portion of the first fluid moves in a second directed around the exterior surface of the second conduit.

Optionally, the method may include directing the first fluid out of the first conduit via an outlet of the first conduit in a first radial direction, and directing the second fluid out of the second conduit via an outlet of the second conduit in a second radial direction that is offset from the first radial direction. The first radial direction may be coplanar with the second radial direction.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are within the scope of the claims if they have structural elements that do not differ from the literal language of the clauses, or if they include equivalent structural elements with insubstantial differences from the literal language of the claims.

What is claimed is:

1. A fluid control device comprising:

a first conduit oriented along a first axis having a first end and a second end, a first fluid configured to move within the first conduit between the first and second ends, the first conduit comprising an interior surface defining a cavity of the first conduit; and a second conduit oriented along a second axis having a third end and a fourth end, a second fluid configured to move within the second conduit between the third and fourth ends, the second conduit comprising an exterior surface and a structure coupled with, extending a distance away from, and gradually tapered from the exterior surface, wherein the second axis is different than the first axis, wherein a portion of the second conduit extends through a portion of the first conduit where the first axis and the second axis intersect;

wherein the cavity of the first conduit oriented along the first axis extends beyond a portion where the first axis and the second axis intersect, wherein at least a portion of the second conduit extends within the cavity, and wherein the first fluid is configured to be separate from the second fluid as the first fluid moves within the first conduit and the second fluid moves within the second conduit.

2. The fluid control device of claim 1, wherein the exterior surface is separated from the interior surface.

3. The fluid control device of claim 1, wherein the structure is operably coupled with the exterior surface.

4. The fluid control device of claim 1, wherein the first fluid is configured to interfere with the structure as the first fluid moves within the first conduit.

5. The fluid control device of claim 1, wherein the first fluid is configured to separate into a first portion of the first fluid and a second portion of the first fluid, wherein the first portion is configured to move in a first direction around the exterior surface along a first passage, and wherein the second portion is configured to move in a second direction around the exterior surface along a second passage, wherein the first passage and the second passage are disposed on opposite sides of the second conduit.

6. The fluid control device of claim 5, wherein the first portion is configured to combine with the second portion subsequent to the second conduit.

7. The fluid control device of claim 1, wherein the first fluid is configured to have flow characteristics at a location upstream of the second conduit, and the first fluid is configured to have the same flow characteristics at a location downstream of the second conduit.

8. The fluid control device of claim 1, wherein the first fluid is configured to move within the first conduit in a first direction, and the second fluid is configured to move within the second conduit in a different, second direction.

9. The fluid control device of claim 1, wherein the first conduit comprises a first outlet disposed at the second end, and the second conduit comprises a second outlet disposed at the fourth end, wherein the first fluid is configured to be directed out of the first outlet in a first radial direction, and wherein the second fluid is configured to be directed out of the second outlet in a second radial direction that is radially offset from the first radial direction.

10. The fluid control device of claim 9, wherein the first radial direction is coplanar with the second radial direction.

11. The fluid control device of claim 1, wherein the first conduit and the second conduit are formed as a unitary structure.

12. The fluid control device of claim 1, wherein the first fluid is configured to be directed out of the first conduit and toward a surface of a route along which a vehicle moves to remove at least some debris from the surface, and the second fluid is configured to be directed out of the second conduit and toward the surface to improve traction of a wheel against the surface.

13. A traction control system comprising:

the fluid control device of claim 1, wherein the first conduit is configured to be coupled to a compressed air system of a vehicle for receiving the first fluid from the compressed air system, wherein the first fluid comprises compressed air, wherein the first conduit is configured to direct the compressed air towards a surface of a route along which the vehicle moves to clean debris, wherein the second conduit is configured to be coupled to a sanding system of the vehicle for receiving the second fluid from the sanding system, wherein the second fluid comprises sand mixed with air, and wherein the second conduit is configured to direct the sand mixed with air towards an interface surface between the route and a wheel of the vehicle to improve traction of the wheel against the route.

14. A control device comprising:

a first conduit oriented along a first axis having a first end and a second end, a first fluid configured to move within the first conduit between the first and second ends, the first conduit comprising an interior surface defining a cavity of the first conduit; and a second conduit oriented along a second axis having a third end and a fourth end, a second fluid configured to move within the second conduit between the third and fourth ends, wherein at least a portion of the second conduit extends within the cavity, wherein the first fluid is configured to be separate from the second fluid as the first and second fluids move within the first and second conduits, wherein the second conduit comprises an exterior surface separated from the interior surface and a structure operably coupled, extending a distance away from, and gradually tapered from the exterior surface, and wherein the first fluid is configured to interfere with the structure as the first fluid moves within the first conduit, wherein the second axis is different than the first axis, wherein a portion of the second conduit extends through a portion of the first conduit where the first axis and the second axis intersect, wherein the cavity of the first conduit oriented along the first axis extends beyond a portion where the first axis and the second axis intersect.

15. The control device of claim 14, wherein the first fluid is configured to separate into a first portion of the first fluid and a second portion of the first fluid, wherein the first portion is configured to move in a first direction along a first passage around the exterior surface, and the second portion is configured to move in a second direction around the exterior surface along a second passage, wherein the first passage and the second passage are disposed on opposite sides of the second conduit.

16. The control device of claim 14, wherein the first fluid is configured to move within the first conduit in a first radial direction, wherein the second fluid is configured to move within the second conduit in a different, second radial direction, and wherein the first radial direction is coplanar with the second radial direction.

17. The control device of claim 14, wherein the first fluid is configured to be directed out of the first conduit and toward a route surface of a route along which a vehicle moves to remove at least some debris from the route surface, and wherein the second fluid is configured to be directed out of the second conduit and toward the route surface to improve traction of a wheel against the route surface.

18. The control device of claim 17, wherein the first fluid is configured to change a characteristic of the route surface, and wherein the second fluid is configured to change a characteristic of an interface between the route surface and a wheel surface of the wheel.

19. A method comprising:

directing a first fluid to move within a first conduit oriented along a first axis between a first end and second end of the first conduit, the first conduit comprising an interior surface defining a cavity of the first conduit;

directing a second fluid to move within a second conduit oriented along a second axis between a third end and a fourth end of the second conduit, at least a portion of the second conduit extending within the cavity, the first fluid being separate from the second fluid as the first and second fluids move within the first and second conduits, respectively, the second conduit comprising an exterior surface and a structure coupled with, extending a distance away from, and gradually tapered from the exterior surface, wherein the second axis is different than the first axis, wherein a portion of the second conduit extends through a portion of the first conduit where the first axis and the second axis intersect;

wherein the cavity of the first conduit oriented along the first axis extends beyond a portion where the first axis and the second axis intersect; and separating the first fluid into a first portion of the first fluid and a second portion of the first fluid, wherein the first portion is configured to move in a first direction around the exterior surface, and wherein the second portion of the first fluid is configured to move in a second direction around the exterior surface.

20. The method of claim 19, further comprising:

directing the first fluid out of the first conduit via an outlet of the first conduit in a first radial direction along a first passage; and directing the second fluid out of the second conduit via an outlet of the second conduit in a second radial direction that is offset from the first radial direction, wherein the first radial direction is coplanar with the second radial direction along a second passage, wherein the first passage and the second passage are disposed on opposite sides of the second conduit.

* * * * *